(12) United States Patent
Yin et al.

(10) Patent No.: US 11,668,971 B2
(45) Date of Patent: Jun. 6, 2023

(54) BACKLIGHT AND DISPLAY APPARATUS

(71) Applicant: WUHAN CHINA STAR OPTOELECTRONICS TECHNOLOGY CO., LTD., Hubei (CN)

(72) Inventors: Bingkun Yin, Hubei (CN); Guanghui Liu, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 242 days.

(21) Appl. No.: 17/057,665

(22) PCT Filed: Sep. 25, 2020

(86) PCT No.: PCT/CN2020/117694
§ 371 (c)(1),
(2) Date: Nov. 22, 2020

(87) PCT Pub. No.: WO2021/258570
PCT Pub. Date: Dec. 30, 2021

(65) Prior Publication Data
US 2022/0187656 A1    Jun. 16, 2022

(30) Foreign Application Priority Data
Jun. 23, 2020    (CN) .................... 202010577340.6

(51) Int. Cl.
*G02F 1/1335* (2006.01)
*G02F 1/13357* (2006.01)

(52) U.S. Cl.
CPC .. *G02F 1/133553* (2013.01); *G02F 1/133615* (2013.01); *G02F 1/133528* (2013.01)

(58) Field of Classification Search
USPC ........................................................ 362/97.1
See application file for complete search history.

(56) References Cited

U.S. PATENT DOCUMENTS

| | | |
|---|---|---|
| 2008/0049168 A1 | 2/2008 | Kubota |
| 2012/0236588 A1 | 9/2012 | Shin |
| 2013/0286327 A1* | 10/2013 | Huang ................. G02B 6/0031 362/606 |
| 2015/0185410 A1* | 7/2015 | Song .................... G02B 6/0091 362/606 |

(Continued)

FOREIGN PATENT DOCUMENTS

| | | |
|---|---|---|
| CN | 102081187 A | 6/2011 |
| CN | 102239360 A | 11/2011 |

(Continued)

*Primary Examiner* — Christopher M Raabe
(74) *Attorney, Agent, or Firm* — PV IP PC; Wei Te Chung; Zhigang Ma

(57) ABSTRACT

The present invention provides a backlight and a display apparatus. The backlight comprises a substrate and at least one light source. The substrate has a first surface and a second surface along a thickness direction of the substrate. The first surface and the second surface are both continuous. The first surface has at least one light incident surface in the edge area. A light source is opposed to or in contact with the light incident surface to provide the substrate with light through the light incident surface.

12 Claims, 4 Drawing Sheets

(56) References Cited

U.S. PATENT DOCUMENTS

| | | | |
|---|---|---|---|
| 2016/0033705 A1* | 2/2016 | Fattal | G02B 6/0031 |
| | | | 359/462 |
| 2016/0266299 A1* | 9/2016 | Yoon | G02B 6/0091 |
| 2017/0293065 A1 | 10/2017 | Kim | |
| 2018/0321556 A1* | 11/2018 | Watanabe | G02F 1/133603 |
| 2019/0094447 A1* | 3/2019 | Tan | G02B 6/002 |
| 2019/0196083 A1 | 6/2019 | Aoki | |
| 2021/0191026 A1* | 6/2021 | Cho | G02B 6/0026 |

FOREIGN PATENT DOCUMENTS

| | | | |
|---|---|---|---|
| CN | 102980105 A | | 3/2013 |
| CN | 104749818 A | | 7/2015 |
| CN | 105242457 A | * | 1/2016 |
| CN | 105782815 A | | 7/2016 |
| CN | 105807493 A | | 7/2016 |
| CN | 106772760 A | | 5/2017 |
| CN | 109239965 A | | 1/2019 |
| CN | 209746313 U | | 12/2019 |
| CN | 209946440 U | | 1/2020 |
| CN | 111308775 A | | 6/2020 |

\* cited by examiner

BACKLIGHT AND DISPLAY APPARATUS

CROSS-REFERENCE TO RELATED APPLICATION

This application claims priority to Chinese patent application No. 202010577340.6, which was filed with the China National Intellectual Property Administration (CNIPA) on Jun. 23, 2020 and titled "BACKLIGHT, DISPLAY SUBSTRATE AND DISPLAY APPARATUS." The entire contents of the application are incorporated herein by reference.

BACKGROUND OF INVENTION

Field of Invention

The present invention relates to the field of display technology and, in particular, to a backlight and a display apparatus.

With the development of digital technology, liquid crystal display (LCD) products have been widely used in all aspects of daily life. The current mobile terminal market has an increasing demand for high screen-to-body ratio designs. Therefore, how to compress a frame of a non-display area in a design of an LCD screen has become a focus of various manufacturers.

Existing LCD products mostly place a light emitting diode (LED) light source of a backlight on a side of a light guide plate. Due to size limitations of the LED light source, a frame of the backlight cannot be infinitely reduced, thereby affecting a frame size of an entire display screen.

Therefore, there is an urgent need to provide a backlight and a display apparatus to solve the above-mentioned problems.

In order to solve the above-mentioned problems, the present invention provides a backlight and a display apparatus. By providing a light incident surface in an edge area of a first surface of a substrate, an area of the non-display area can be reduced, and the screen-to-body ratio can be increased.

In order to achieve the above objectives, the backlight and display apparatus described herein adopt the following technical solutions.

SUMMARY

The present invention provides a backlight, the backlight comprises a substrate and at least one light source. The substrate comprises a central area and at least one edge area disposed at a periphery of the central area, the substrate has a first surface and a second surface in a thickness direction of the substrate, the first surface and the second surface are both continuous, the first surface has at least one light incident surface in the edge area, the second surface has a second deflection surface in the edge area, the second deflection surface is a surface formed by the deviation of the second surface in the edge area away from a surface where the central area is located, and the second deflection surface is configured to deflect and emit light entering the second deflection surface in the substrate; an orthographic projection of the light incident surface on the substrate falls within an orthographic projection of the second deflection surface on the substrate. The light source is opposed to or in contact with the light incident surface to provide the substrate with light through the light incident surface, and the light provided by the light source enters the substrate through the light incident surface and is guided by the substrate to emit evenly from the second surface. Furthermore, the first surface has a first deflection surface in the edge area, and the first deflection surface is a surface formed by the deviation of the first surface in the edge area away from a surface where the central area is located, the first deflection surface is configured to deflect light entering the first deflection surface, and at least a part of the first deflection surface is used for the light incident surface.

Furthermore, the first deflection surface is a surface formed by the deviation of the first surface in the edge area away from a surface where the central area is located in a direction toward the second surface; the backlight further comprises a placement space on the first deflection surface and is complementary to the substrate in shape; the placement space is configured to place the light source and filled with optical media; the reflective layer further covers an outer surface of a filling space on the first deflection surface.

Furthermore, the first deflection surface is an inclined surface. The filling space is a wedge-shaped space complementary to the substrate.

Furthermore, the second deflection surface is an inclined surface.

Furthermore, the substrate is provided with a plurality of reflective dots in an area of the first surface other than the light incident surface; and a distribution density of the plurality of reflective dots increases along a direction away from the light incident surface.

The present invention further provides a backlight, the backlight comprises a substrate and at least one light source.

Furthermore, the backlight further has a reflective layer, and the reflective layer covers a surface of the substrate other than the second surface and the light incident surface.

Furthermore, the first surface has a first deflection surface in the edge area, and the first deflection surface is a surface formed by the deviation of the first surface in the edge area away from a surface where the central area is located, the first deflection surface is configured to deflect light entering the first deflection surface, and at least a part of the first deflection surface is used for the light incident surface.

Furthermore, the first deflection surface is a surface formed by the deviation of the first surface in the edge area away from a surface where the central area is located in a direction toward the second surface; the backlight further comprises a placement space on the first deflection surface and is complementary to the substrate in shape; the placement space is configured to place the light source and filled with optical media; the reflective layer further covers an outer surface of a filling space on the first deflection surface.

Furthermore, the first deflection surface is an inclined surface. The filling space is a wedge-shaped space complementary to the substrate.

Furthermore, the second surface has a second deflection surface in the edge area, and the second deflection surface is a surface formed by the deviation of the second surface in the edge area away from a surface where the central area is located, and the second deflection surface is configured to deflect and emit light entering the second deflection surface in the substrate; and an orthographic projection of the light incident surface on the substrate falls within an orthographic projection of the second deflection surface on the substrate.

Furthermore, the second deflection surface is an inclined surface.

Furthermore, the substrate is provided with a plurality of reflective dots in an area of the first surface other than the light incident surface; and a distribution density of the plurality of reflective dots increases along a direction away from the light incident surface.

Furthermore, the substrate is provided with an optical layer group on the second surface, the optical layer group comprises: at least one diffusion layer sequentially laminated on the second surface; and at least one prism layer sequentially laminated on a surface of the diffusion layer facing away from the substrate.

Furthermore, the optical layer group further comprises an optical base layer located on the second surface of the substrate and covering the second surface; the diffusion layer is a diffusion dot layer covered in the optical base layer or between the optical base layer and the substrate, and the prism layer is a prism structure layer covered in the optical base layer; assuming that the substrate has a first refractive index a, the reflective layer and the prism layer have a second refractive index b, and the optical base layer has a third refractive index c, the refractive indexes a, c, and b meet the following relationship: b>a>c.

The present invention further provides a display apparatus, the display apparatus comprises a backlight, the backlight comprises a substrate and at least one light source. The substrate comprises a central area and at least one edge area disposed at a periphery of the central area, the substrate has a first surface and a second surface in a thickness direction of the substrate, the first surface and the second surface are both continuous, the first surface has at least one light incident surface in the edge area; the light source is opposed to or in contact with the light incident surface to provide the substrate with light through the light incident surface; and the light provided by the light source enters the substrate through the light incident surface and is guided by the substrate to emit evenly from the second surface.

Furthermore, the display apparatus comprises a display substrate, and the display substrate comprises the backlight and a functional layer. The functional layer is disposed on a surface of the backlight away from the light source, and the functional layer comprises at least one of a thin film transistor layer or a filter layer.

Furthermore, the display substrate comprises a polarizing layer, and the polarizing layer is disposed on a surface of the functional layer facing away from the backlight.

By installing the light source in the edge area of the first surface of the substrate, the backlight of the present invention can reduce the area of the non-display area, increase the screen-to-body ratio, and overcome the problem of a large frame of the existing edge-type backlight. The backlight of the present invention can adjust the light emission effect in the edge area by setting the second deflection surface on the second surface; thereby reducing light loss and improving the overall luminous efficiency of the backlight. The backlight of the present invention can make a deflection adjustment of the light entering the substrate by forming the first deflection surface on the substrate, and improve the light source efficiency of the entire substrate. The display substrate of the present invention uses the substrate of the backlight as the substrate to further integrate at least one of the thin film transistor layer or the color filter layer, thereby realizing the integration of the display substrate and the backlight, which is beneficial to realize the thinness and light weight of the display panel or the display apparatus. By adopting the backlight or the display substrate described in the present invention, the display apparatus of the present invention can meet the requirements of narrow frame, light weight and thinness.

DETAILED DESCRIPTION OF EMBODIMENTS

The present invention provides a backlight and a display apparatus. To make the objectives, technical solutions, and effects of the present invention more clear and specific, the present invention is described in further detail below with reference to the embodiments accompanying with drawings. It should be understood that the specific embodiments described herein are merely for explaining the present invention, and the present invention is not limited thereto.

Figure 1:
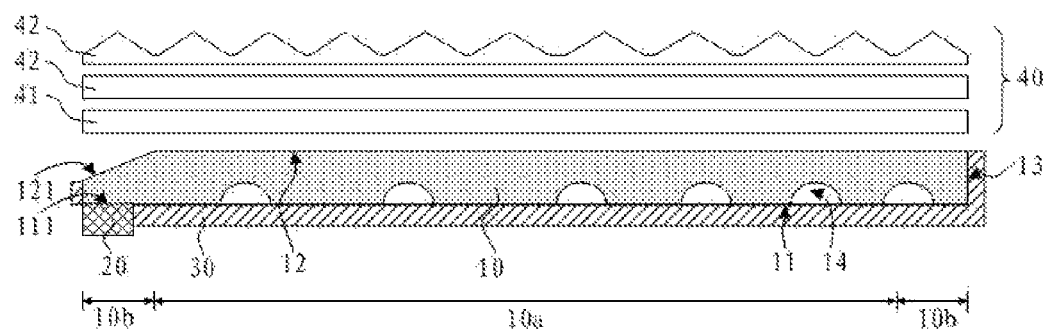
FIG. 1 is a schematic structural diagram of a first embodiment of a backlight in accordance with the present invention.
Figure 2:
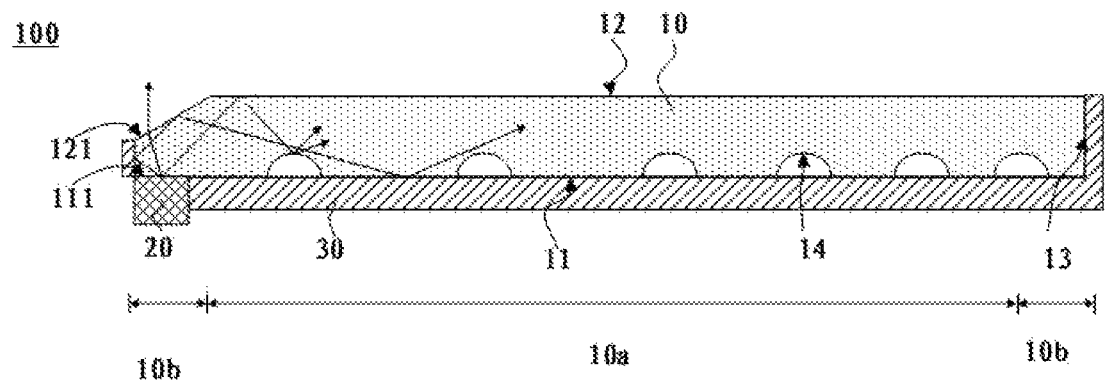
FIG. 2 is a light path diagram of the backlight as shown in FIG. 1.

FIG. 1 is a schematic structural diagram of a first embodiment of a backlight in accordance with the present invention, and FIG. 2 is a light path diagram of the backlight shown in FIG. 1. As shown in FIG. 1, the present invention provides a backlight. The backlight 100 comprises a substrate 10 and a light source 20.

Referring to FIG. 1, the substrate 10 comprises a central area 10a and an edge area 10b disposed at a periphery of the central area 10a. The substrate 10 has a first surface 11 and a second surface 12 along a thickness direction of the substrate 10; the first surface 11 and the second surface 12 are both continuous. The first surface 11 has at least one light incident surface 111 in the edge area 10b; the light source 20 is opposed to or in contact with the light incident surface 111 to provide the substrate 10 with light through the light incident surface 111. Light provided by the light source 20 enters the substrate 10 through the light incident surface 111 and is guided by the substrate 10 to emit evenly from the second surface 12.

The backlight 100 of the present invention can reduce an area of a non-display area of a display panel by positioning the light source 20 at a position opposite to or in contact with the light incident surface 111, thereby increasing the screen-to-body ratio and finally achieving narrow bezels.

As shown in FIG. 1, a thickness of the substrate 10 in the edge area 10b is less than thickness in the central region 10a.

As shown in FIG. 1, the second surface 12 of the substrate 10 is a continuous plane as a whole.

As shown in FIG. 1, the substrate 10 has a plurality of reflective dots 14 on the first surface 11, and the reflective dots 14 may be circular, rectangular, triangular, etc.

Preferably, a distribution density of the reflective dots 14 increases along a transmission direction of light in the substrate 10. In other words, the distribution density of the reflective dots 14 increases along a direction away from the light incident surface 111.

As shown in FIG. 1, the second surface 12 has a second deflection surface 121 in the edge area 10b, and the second deflection surface 121 is a surface formed by the deviation of the second surface 12 in the edge area 10b away from a surface where the central area 10a is located. The second deflection surface 121 is configured to deflect and emit light entering the second deflection surface 121 in the substrate 10 toward a preset target direction.

As shown in FIG. 2, the second deflection surface 121 is configured to deflect and emit light entering the second deflection surface 121 in the substrate 10. In other words, the second deflection surface 121 can deflect and adjust the angle of light emitted through the edge area 10 of the substrate 10 to improve the light utilization rate of the backlight. For example, the second deflection surface 121 is used to deflect the light from the edge area of the backlight toward the effective display area of the display panel, thereby reducing light directed to the non-display area of the display panel and improving the effective utilization of light.

As a preferred embodiment, an orthographic projection of the second deflection surface 121 on a display panel covers the frame sealant of the display panel.

Referring to FIG. 1 again, as a preferred implementation structure, the second deflection surface 121 is an inclined surface; that is, the second deflection surface 121 is a tapered plane. For example, in this embodiment, the second surface 12 is a plane in the central area 10a, and the second deflection surface 121 is a tapered plane adjacent to and at an angle to the above plane.

It should be pointed out that the present invention does not limit the specific structure, arrangement position, or size of the second deflection surface 121. In an actual design, any configuration may be implemented as long as the second deflection surface 121 is appropriate, and light passing through the second deflection surface 121 in the substrate 10 can be deflected according to the preset target direction. For example, in other implementation structures, the second deflection surface 121 may be a curved surface.

In specific implementation, the second deflection surface 121 is formed by cutting at least one end of the second surface 12 of the substrate 10, and the cutting means is knife wheel cutting or laser cutting. In this embodiment, the second deflection surface 121 formed by cutting is an inclined surface.

In specific implementation, the substrate 10 is made of a material that can be used for a light guide plate or a light guide layer. For example, the substrate 10 is made of polymethyl methacrylate (PMMA), polycarbonate (PC), polyethylene (PE), polypropylene (PP), polyethylene terephthalate (PET), or polyimide (PI).

Specifically, the reflective dots 14 are formed by recessing the second surface 12 toward the second surface 12. For example, in this embodiment, the cross-section of the reflective dots 14 is semicircular. In other embodiments, the cross-section of the reflective dots 14 may be triangular or other cross-sectional shapes with scattering function.

As shown in FIG. 1, the light source 20 is opposite to or in contact with the light incident surface 111. For example, in this embodiment, the light source 20 is held on the light incident surface 111.

"Held" means that the light source 20 is positioned or fixed. The present invention does not limit the connection relationship between the light source 20 and the substrate 10 herein. For example, in this embodiment, the light source 20 can be held on a surface of the substrate 10 by the cooperation of the light source 20 and a back plate. In other embodiments, the light source 20 may be fixed or held on the second surface 12 by means of optical sealant or a backlight frame, etc.

As shown in FIG. 1, an orthographic projection of the light source 20 on the substrate 10 falls within an orthographic projection of the second deflection surface 121 on the substrate 10.

As a preferred embodiment, an orthographic projection of the light source 20 on a display panel corresponds to the frame sealant of the display panel.

In specific implementation, the light source 20 may be an LED light source.

It should be noted that the present invention does not limit the specific distribution or arrangement of the light source 20 on the substrate 10, nor does it limit the specific number or quantity of the light source 20.

As shown in FIG. 1, the backlight 100 further comprises a reflective layer 30, and the reflective layer 30 covers a surface of the substrate 10 other than the second surface 12 and the light incident surface 111. For example, in this embodiment, the substrate 10 further comprises a plurality of side surfaces 13 adjacent to the first surface 11 and the second surface 12. The reflective layer 30 covers an area of the first surface 11 of the substrate 10 other than the light incident surface 111 and covers a side surface 13 of the substrate 10.

Specifically, the reflective layer 30 may be a single-layer structure or a multi-layer laminated structure. The film used to form the reflective layer 30 may be at least one of a light reflective film or a metal reflective layer. The metal reflective layer may be a metal with a reflective function or a light-reflecting function. The metal with a reflection function or a light-reflecting function may be, but is not limited to, aluminum (Al) or silver (Ag). The metal reflective layer can be formed by a physical vapor deposition (PVD) process. The reflective layer 30 can be a reflective film that can be directly attached.

As shown in FIG. 1, the first surface 11 of the substrate 10 is further provided with an optical layer group 40, and the optical layer group 40 comprises at least one diffusion layer 41 and at least one prism layer 42. The diffusion layer 41 is disposed on the second surface 12 of the substrate 10, and the prism layer 42 is disposed on a surface of the diffusion layer 41 facing away from the substrate 10.

In this embodiment, the diffusion layer 41 may be a diffusion sheet or a diffusion plate. In other embodiments, the diffusion layer 41 may also be a light diffusion material layer directly formed on the substrate 10 from a material having light diffusion properties, or a diffusion structure layer formed on the substrate 10 with a light-transmitting material. The present invention does not specifically limit the specific structure, form or material of the diffusion layer 41. As long as the actual configuration of the diffusion layer 41 is reasonable, the effect of diffusing incident light can be achieved.

As shown in FIG. 1, in this embodiment, the optical layer group 40 comprises a first prism layer in contact with the diffusion layer 41 and a second prism layer on a surface of the first prism layer facing away from the diffusion layer 41.

In this embodiment, the prism layer 42 may be a prism sheet or a prism plate.

In other embodiments, the optical layer group 40 can also comprise other optical functional layers such as, but are not limited, to, a fluorescent layer or a polarizing layer. At the same time, it should be noted that the present invention does not limit the specific structure of the reflective layer 41 or the prism layer 42. That is to say, those skilled in the art can carry out experimental settings or unproved designs of the optical layer group 40 according to the teachings of the present invention and according to actual design requirements, which belong to the common technical means in the art and will not be described in detail herein.

Figure 3:
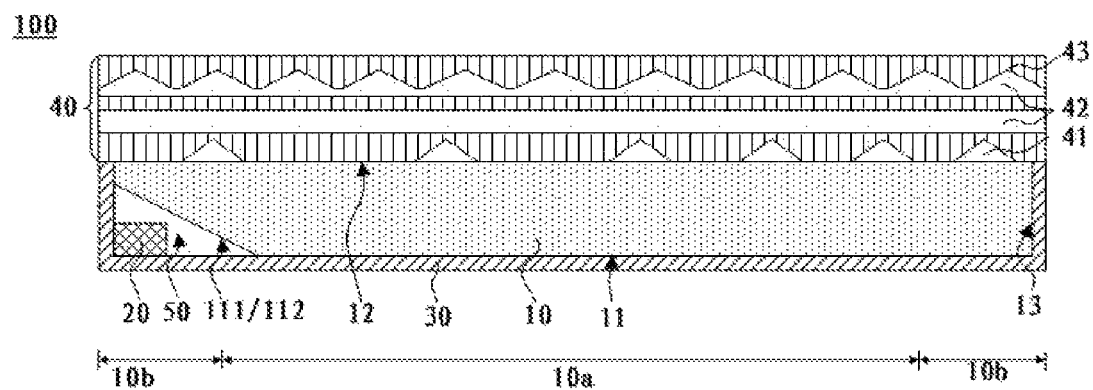
FIG. 3 is a schematic structural diagram of a second embodiment of a backlight in accordance with the present invention.
Figure 4:
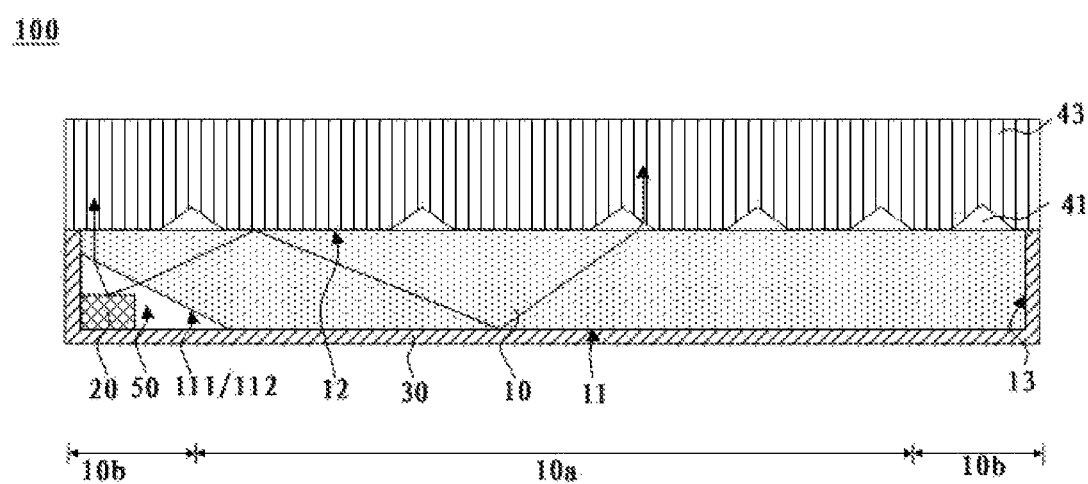
FIG. 4 is a light path diagram of the backlight shown in FIG. 1.

FIG. 3 is a schematic structural diagram of a second embodiment of a backlight in accordance with the present invention. FIG. 4 is a light path diagram of the backlight shown in FIG. 1.

As shown in FIG. 3, compared with the backlight in the embodiment shown in FIG. 1, the biggest difference of the backlight shown in FIG. 2 are the substrate 10 and the optical module group 40.

As shown in FIG. 3, the first surface 11 has at least one first deflection surface 112 in the edge area 10b, and at least a part of the first deflection surface 112 is used for the light incident surface 111. For example, as shown in FIG. 2, in this embodiment, the first deflection surface 112 is used for the light incident surface 111.

As shown in FIG. 3, the first deflection surface 112 is a surface formed by the deviation of the first surface 11 in the edge area 10b away from a surface where the central area 10a is located, and the first deflection surface 112 is configured to deflect light entering the first deflection surface 112 and make the light enter the substrate 10.

As shown in FIG. 3, an orthographic projection of the light source 20 on the substrate 10 falls within an orthographic projection of the first deflection surface 112 on the substrate 10.

As shown in FIG. 4, the first deflection surface 112 serves as the light incident surface 111, which can adjust deflection of light entering the substrate 10 and reduce the light loss of the light source 20, so as to ensure that light from the light source 20 can be transmitted into the substrate 10 at a greater incident angle. The deflection angle of light caused by refraction after entering the substrate 10 is reduced, so as to solve the hotspot phenomenon caused by the refraction of the light emitted by the light source 20 entering the substrate 10, thereby alleviating the problem of dark bands and uneven brightness of the substrate 10 and improving the overall luminous efficiency of the backlight.

As a preferred embodiment, an orthographic projection of the first deflection surface 112 on a display panel covers the frame sealant of the display panel.

As shown in FIG. 3, the first deflection surface 112 is an inclined surface; that is, the first deflection surface 112 is a tapered plane. For example, in this embodiment, the first surface 11 is a plane in the central area 10a, and the first deflection surface 112 is a tapered plane adjacent to and at an angle to the above plane.

Similarly, it should be pointed out that, the present invention does not limit the specific structure, arrangement position or size of the first deflection surface 112. In an actual design, the design would qualify as long as the first deflection surface 112 is appropriately configured, and light passing through the first deflection surface 112 and into the substrate 10 can be deflected according to the preset target direction. For example, in other implementation structures, the first deflection surface 112 may be a curved surface.

In specific implementation, the first deflection surface 112 is formed by cutting at least one side of the first surface 12 of the substrate 10, and the cutting means is knife wheel cutting or laser cutting.

As shown in FIG. 3, the first deflection surface 112 is a surface formed by the deviation of the first surface 11 in the edge area 10b away from a surface where the central area 10a is located toward the second surface 12.

The backlight 100 defines a filling space 50 on the first deflection surface 112 by an optical media; the filling space 50 is complementary to the substrate 10 in shape, and the light source 20 is arranged in the filling space.

Specifically, the optical media in the filling space 50 has a fourth refractive index d, and the substrate has a first refractive index a, then the refractive indexes a and d satisfy the following relationship: a>b.

In a specific implementation, the optical media may be optical sealant, and a refractive index of the optical sealant is less than a refractive index of the substrate 10.

As shown in FIG. 3, the reflective layer 30 covers a surface of the filling space facing away from the first deflection surface 121. The installation space is filled with optical sealant, and the refractive index of the optical sealant is less than the refractive index of the substrate.

As shown in FIG. 3, the second surface 12 is a continuous plane.

As shown in FIG. 3, the optical layer group 40 comprises an optical base layer 43, at least one diffusion layer 41, and at least one prism layer 42.

As shown in FIG. 3, the optical base layer 43 is located on and in contact with the second surface 12 of the substrate 10. In specific implementation, the optical base layer 43 may be directly formed on the second surface 12 of the substrate 10 by coating or film coating.

As shown in FIG. 3, the diffusion layer 42 is a diffusion dot layer located between the second surface 12 and the optical base layer 43 or covered in the optical base layer 43. The prism layer 42 is a prism structure layer covered in the optical base layer 43.

Specifically, the substrate 10 has a first refractive index a; the diffusion layer 41 and the prism layer 42 have a second refractive index b; and the optical base layer 43 has a third refractive index c. The refractive indexes a, c, and b satisfy the following relationship: b>a>c.

By adjusting the refractive indexes of the substrate 10, the optical base layer 43, the diffusion layer 41, and the prism layer 42, the backlight 100 of the present invention can control the uniformity and concentration of the light emitted therefrom.

In specific implementation, the diffusion dot layer or the optical base layer 43 can be formed by etching or embossing.

Figure 5:
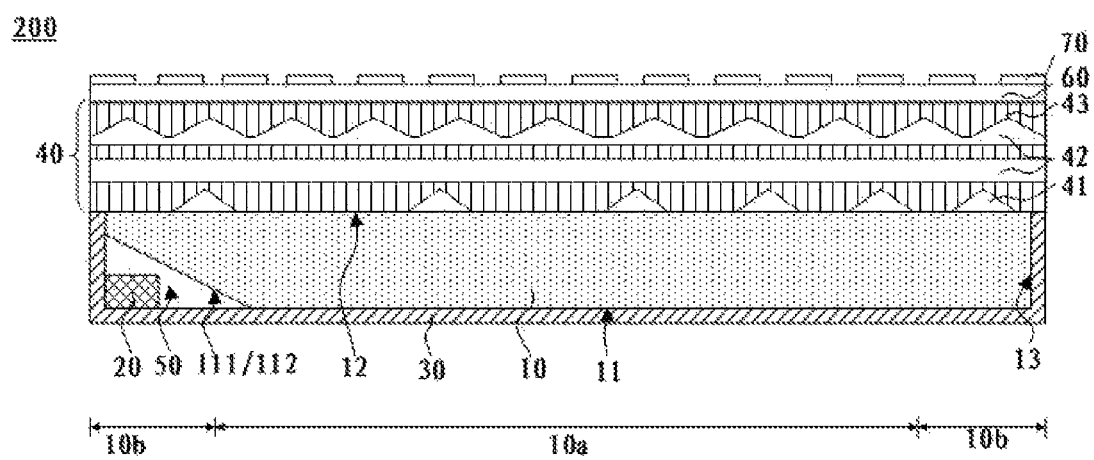
FIG. 5 is a schematic structural diagram of an embodiment of a display substrate in accordance with the present invention.

FIG. 5 is a schematic structural diagram of an embodiment of a display substrate in accordance with the present invention. As shown in FIG. 5, the present invention further provides a display substrate; the display substrate comprises the backlight 100 of the present invention and a functional layer 60 disposed on the second surface 11 of the backlight 100, and the functional layer 60 comprises at least one of a thin film transistor layer or a filter layer.

Specifically, the display substrate 200 may be one of an array substrate, a color filter substrate, or a color filter on array (COA) type substrate, with the substrate 10 of the backlight 100 as a base substrate. In specific implementation, the functional layer 60 can be formed by at least one of a film forming, exposure, development, or etching processes.

As shown in FIG. 5, in this embodiment, the display substrate 200 comprises the backlight 100 shown in FIG. 2. It should be pointed out that the display substrate 200 described in the present invention is not limited to the backlight 100 shown in FIG. 2. For example, the display substrate 200 may also use the backlight shown in FIG. 1, and may also use other configurations of the backlight 100 described in the present invention.

As shown in FIG. 5, there is a planarization layer 80 (not shown in the figure) between the functional layer 60 and the substrate 10, and the planarization layer 80 can planarize the step difference in the optical layer group 40.

As shown in FIG. 5, a polarizing layer 70 is disposed on a surface of the functional layer 60 facing away from the substrate 10. In specific implementation, the polarizing layer 70 may be a wire grid polarizer layer composed of a plurality of wire grid polarizers or a polarizer. For example, in this embodiment, the polarizing layer 70 is a wire grid polarizer layer with a higher light recovery efficiency.

Obviously, the display substrate described in the present invention can integrate the light source 20 into an array substrate, a color filter substrate or a COA type substrate, so that it can be used to realize narrow bezels, light weight, and thinness of a display panel or display apparatus.

The present invention further provides a display apparatus, which comprises the backlight of the present invention or the display substrate of the present invention.

Figure 6:
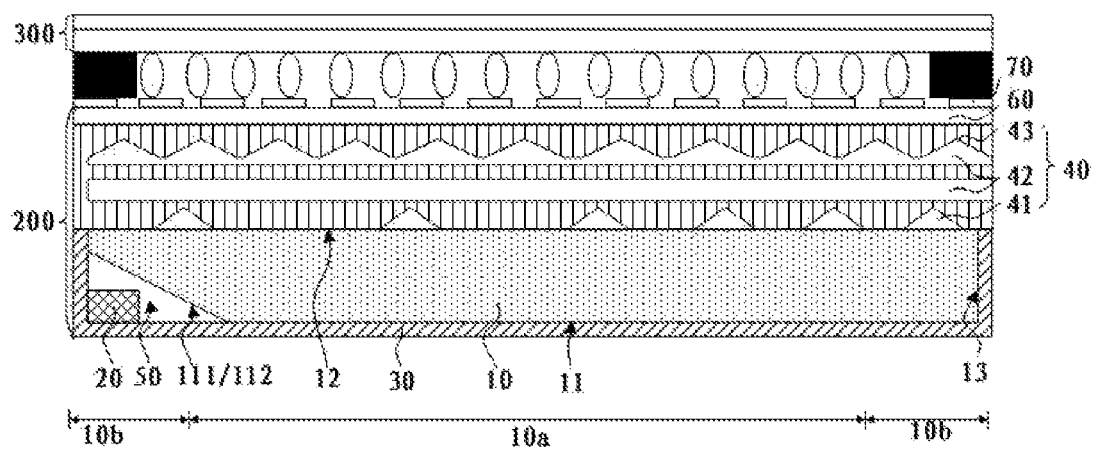
FIG. 6 is a schematic diagram of a first embodiment of a display apparatus in accordance with the present invention.

FIG. 6 is a schematic diagram of a first embodiment of a display apparatus in accordance with the present invention. As shown in FIG. 6, the display apparatus comprises a display panel. The display panel comprises a display substrate 200, a substrate 300 disposed opposite and arranged in a box-to-box fashion with the display substrate 200, and liquid crystals provided between the display substrate 200 and the opposite disposed substrate 300. The display substrate 200 of the present invention is the display substrate 200 described herein, and its specific structure and function can be referred to the above, which will not be repeated here.

As shown in FIG. 6, as a preferred embodiment, the display substrate 200 is an array substrate, and in this case, the opposite disposed substrate 300 is a color filter substrate. As an alternative embodiment, the display substrate 200 may also be a COA substrate or a color filter substrate, and the opposite disposed substrate 300 may correspondingly be a transparent substrate or an array substrate.

As shown in FIG. 6, the opposite disposed substrate 300 comprises a base substrate 310 and another polarizing layer 320 disposed on a surface of the base substrate 310 away from the display substrate.

As shown in FIG. 6, a frame sealant is provided between the peripheral positions which are between the display substrate 200 and the opposite disposed substrate 300, and the frame sealant is used to seal the liquid crystal.

As shown in FIG. 6, an orthographic projection of the frame sealant on the substrate 10 falls within an orthographic projection of the first deflection surface 112 and the second deflection surface 121 on the substrate 10. Therefore, the display substrate 200 can deflect the light from the light source 20 toward the effective display area located in the frame sealant, so as to improve the light utilization rate of the light source 20 when used by the display apparatus.

Figure 7:
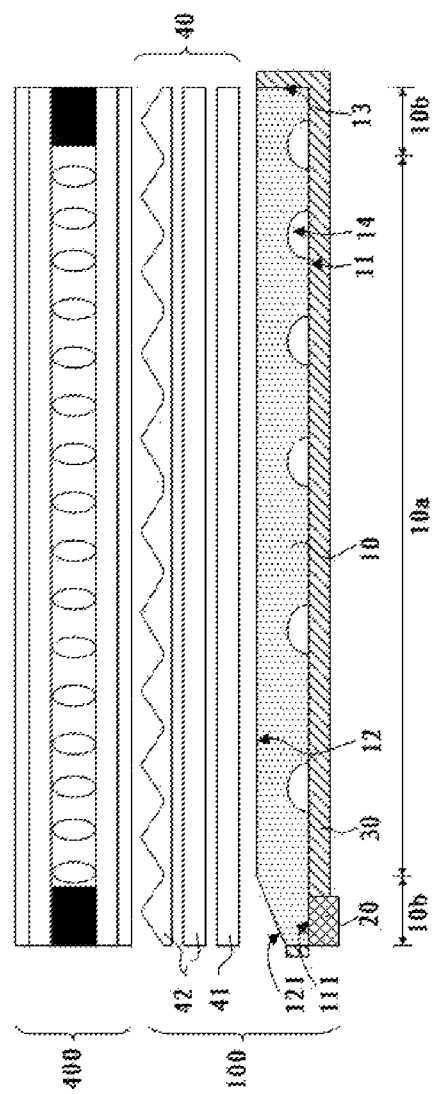
FIG. 7 is a schematic diagram of a second embodiment of a display apparatus in accordance with the present invention.

FIG. 7 is a schematic diagram of a second embodiment of a display apparatus in accordance with the present invention. As shown in FIG. 7, the display apparatus comprises a display panel 400 and a backlight 100. The display panel 100 may be a common liquid crystal display (LCD) panel, and the structure of the common LCD panel will not be repeated here. The backlight 100 is the backlight 100 described herein, and its specific structure can be referred to the above, which will not be repeated here.

For specific implementation of the foregoing operations, refer to the foregoing embodiments. Details are not further described herein.

It can be understood that, for those skilled in the art, equivalent replacements and modifications can be made according to the technical solution and disclosure ideas thereof of the present invention, and all these modifications or replacements are considered within the protection scope of the attached claims of the present invention.

What is claimed is:

1. A backlight, comprising a substrate, a reflective layer, and at least one light source,
   wherein the substrate defines a central area and at least one edge area disposed at a periphery of the central area, the substrate comprises a first surface and a second surface disposed opposite to the first surface and perpendicular to a thickness direction of the substrate, the first surface and the second surface are both continuous, the first surface comprises at least one light incident surface at the edge area, the second surface comprises a deflection surface at the edge area; the deflection surface is inclining to a part of the second surface at the central area, the deflection surface is configured to deflect incident light in the substrate, and an orthographic projection of the light incident surface on the substrate falls within an orthographic projection of the deflection surface on the substrate;
   wherein the light source is disposed opposite to or in contact with the light incident surface to provide the substrate with light through the light incident surface, and the substrate is configured to guide the light provided by the light source enters the substrate through the light incident surface to exit from the second surface; and
   wherein the reflective layer covers a surface of the substrate other than the second surface, the deflection surface, and the light incident surface.

2. The backlight as claimed in claim 1, wherein the deflection surface is an inclined surface.

3. The backlight as claimed in claim 1, wherein the substrate is provided with a plurality of reflective dots in an area of the first surface other than the light incident surface; and
   a distribution density of the plurality of reflective dots increases along a direction away from the light incident surface.

4. A backlight, comprising a substrate, a reflective layer, and at least one light source,
   wherein the substrate defines a central area and at least one edge area disposed at a periphery of the central area, the substrate comprises a first surface and a second surface disposed opposite to the first surface and perpendicular to a thickness direction of the substrate, the first surface and the second surface are both continuous, the first surface comprises at least one light incident surface at the edge area, the second surface comprises a deflection surface at the edge area, the deflection surface is inclining to a part of the second surface at the central area, and the deflection surface is configured to deflect incident light in the substrate;
   wherein the light source is disposed opposite to or in contact with the light incident surface to provide the substrate with light through the light incident surface;
   wherein the substrate is configured to guide the light provided by the light source enters the substrate through the light incident surface to exit from the second surface; and
   wherein the reflective layer covers a surface of the substrate other than the second surface, the deflection surface, and the light incident surface.

5. The backlight as claimed in claim 4, wherein
   an orthographic projection of the light incident surface on the substrate falls within an orthographic projection of the deflection surface on the substrate.

6. The backlight as claimed in claim 5, wherein the deflection surface is an inclined surface.

7. The backlight as claimed in claim 4, wherein the substrate is provided with a plurality of reflective dots in an area of the first surface other than the light incident surface; and a distribution density of the plurality of reflective dots increases along a direction away from the light incident surface.

8. The backlight as claimed in claim 4, further comprising an optical layer group on the second surface, wherein the optical layer group comprises:

at least one diffusion layer sequentially laminated on the second surface; and at least one prism layer sequentially laminated on a surface of the diffusion layer facing away from the substrate.

9. The backlight as claimed in claim 8, wherein the optical layer group further comprises an optical base layer located on the second surface of the substrate and covering the second surface;

the diffusion layer is a diffusion dot layer disposed in the optical base layer or disposed between the optical base layer and the substrate, and the prism layer is a prism structure layer disposed in the optical base layer; and the substrate has a first refractive index a, the reflective layer and the prism layer have a second refractive index b, the optical base layer has a third refractive index c, and the refractive indexes a, c, and b meet the following relationship: b>a>c.

10. A display apparatus comprising a backlight, wherein the backlight comprises a substrate, a reflective layer, and at least one light source;

wherein the substrate defines a central area and at least one edge area disposed at a periphery of the central area, the substrate comprises a first surface and a second surface disposed opposite to the first surface and perpendicular to a thickness direction of the substrate, the first surface and the second surface are both continuous, the first surface comprises at least one light incident surface at the edge area, the second surface comprises a deflection surface at the edge area, the deflection surface is inclining to a part of the second surface at the central area, and the deflection surface is configured to deflect incident light in the substrate;

wherein the light source is disposed opposite to or in contact with the light incident surface to provide the substrate with light through the light incident surface;

wherein the substrate is configured to guide the light provided by the light source enters the substrate through the light incident surface to exit from the second surface; and wherein the reflective layer covers a surface of the substrate other than the second surface, the deflection surface, and the light incident surface.

11. The display apparatus as claimed in claim 10, wherein the display apparatus comprises a display substrate, and the display substrate comprises the backlight and a functional layer; and the functional layer is disposed on a surface of the backlight away from the light source, and the functional layer comprises at least one of a thin film transistor layer or a filter layer.

12. The display apparatus as claimed in claim 11, wherein the display substrate comprises a polarizing layer, and the polarizing layer is disposed on a surface of the functional layer away from the backlight.

* * * * *